Nov. 14, 1944.                C. E. WILLIAMS                2,362,786
                            CAMOUFLAGE MATERIAL
                          Filed Oct. 11, 1941           2 Sheets-Sheet 1
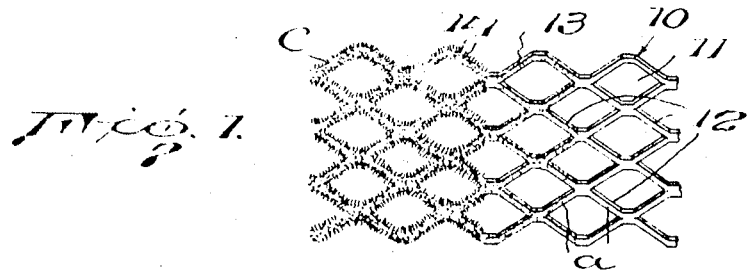
Fig. 1.
Fig. 2.
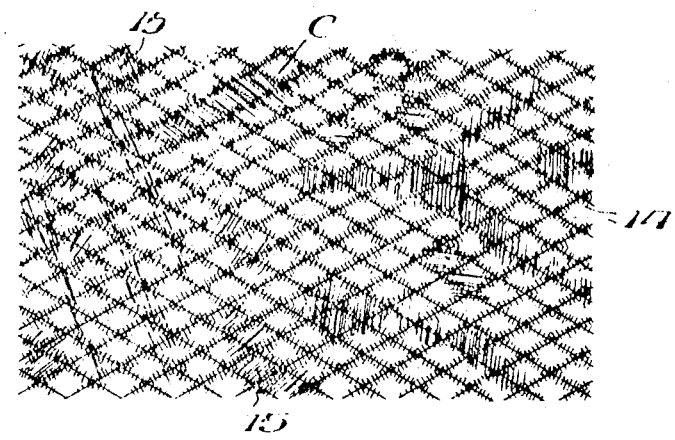
Fig. 3
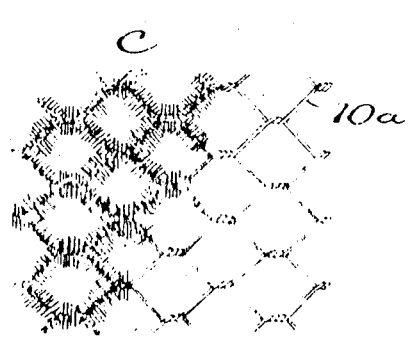
Fig. 5.
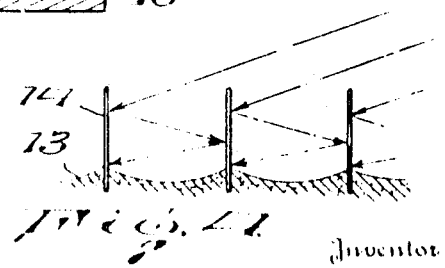
Fig. 4.
Inventor
Carl E. Williams Nov. 14, 1944.   C. E. WILLIAMS   2,362,786
CAMOUFLAGE MATERIAL
Filed Oct. 11, 1941   2 Sheets-Sheet 2
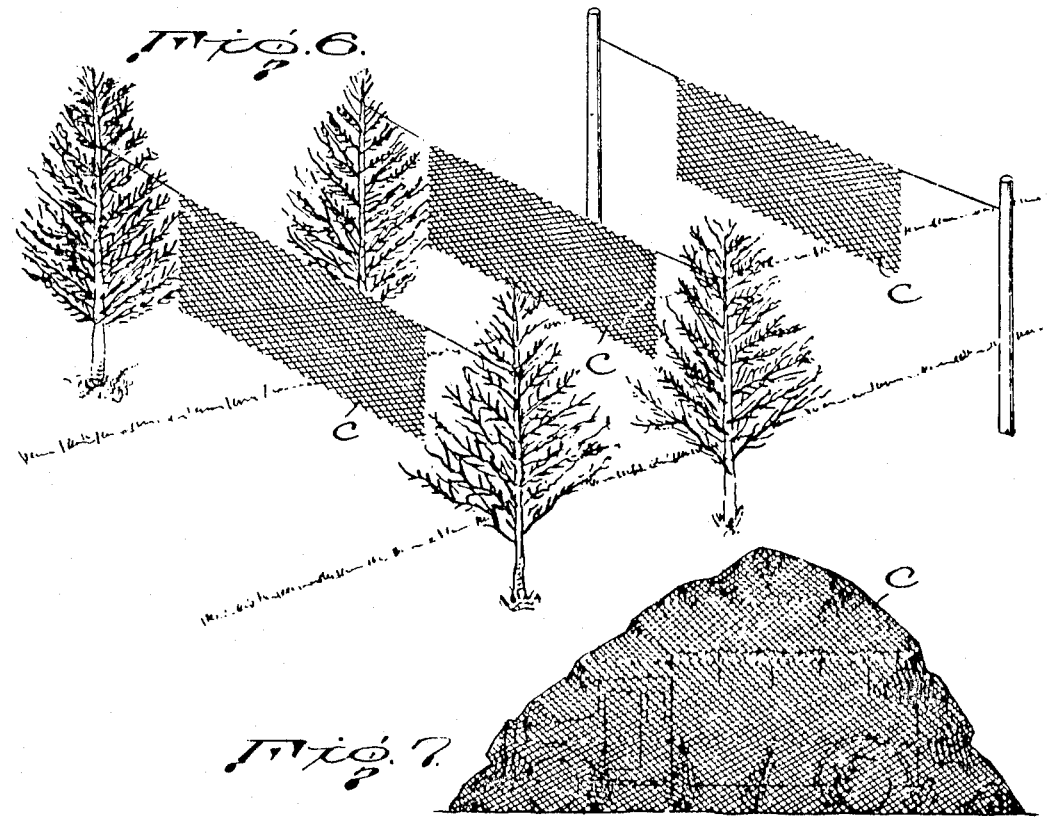
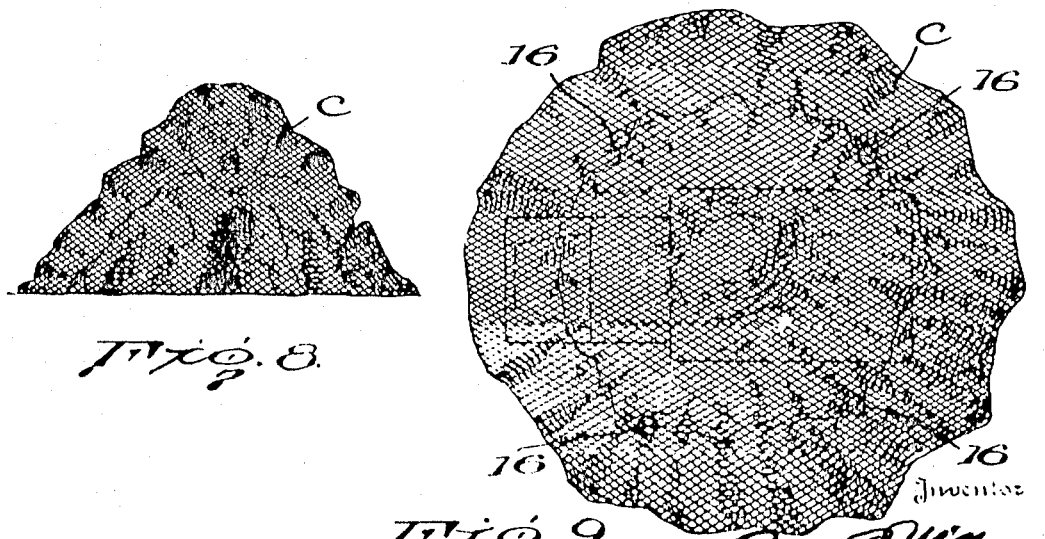

Patented Nov. 14, 1944

2,362,786

UNITED STATES PATENT OFFICE 2,362,786

CAMOUFLAGE MATERIAL

Carl E. Williams, West Middlesex, Pa.

Application October 11, 1941, Serial No. 414,684

6 Claims. (Cl. 117—99)

The present invention relates to an improved camouflage material and the method of producing it.

It has been previously proposed to employ as a camouflage means a pre-manufactured sheet material of painted and/or slitted canvas or cloth as well as netting of cord or metal (such as fish-netting and chicken wire) which have or may have applied to it leaves, tree branches or strips of cloth or other such material arranged in prepared or random designs. There are many drawbacks and disadvantages to such camouflage material as well as its camouflaging effectiveness. Where canvas or other cloth material is employed it has no rigidity, is readily subject to tear, is not self-sustaining in deformed shapes and does not provide a desirable degree of varying color tone density throughout its area unless other conceivable, but more expensive and time consuming, effort is employed in painting or mottling the surfaces of the cloth or other materials applied to the surface. Also, where the canvas or cloth is tightly woven or otherwise provided with solid surfaces or areas it does not provide ventilation or visibility through it from the camouflaged area and offers great resistance to wind, thus the camouflage is frequently blown down in storms; and where the canvas is slitted throughout its area, it is subject to the same disadvantages mentioned above with the additional disadvantage that it is more readily subjected to tear and quicker deterioration due to climatic and the atmospheric elements as well as being snagged in handling.

Where netted material is used such as corded fish-net it is subject to most of the disadvantages mentioned above such as lack of rigidity, being subject to tear, lack of effectiveness especially at close ranges, and not self-sustaining in deformed shapes; it deteriorates quickly when exposed to climatic and atmospheric conditions and requires a great amount of labor in the application of branches, strips of cloth, etc., thereto at times when such labor is not available or feasible.

In such instances where netting, such as chicken wire is employed, it is subject to the same disadvantages as mentioned in connection with fish-netting, except that it is less likely to be torn but falls short of camouflaging effectiveness in the manner it is now employed or has been previously suggested to be employed.

The use of canvas cloth or nettings, as mentioned above, require a number of supporting elements or frames at frequent intervals to give it the desired shapes, thus requiring the provision of and transportation of a large quantity of supporting members especially where such support is not obtainable from nature, such as from rocks, trees, bushes and the like.

The present invention has for its aim the provision of a very simple, relatively inexpensive and easily manufactured camouflage means for concealing objects and objectives, either military, naval or industrial. This means comprises sheet material of desired or convenient size, having great tensil strength and being absolutely fire proof and which is flexible enough to enable it to be easily and manually deformed to shape, yet sufficiently rigid to be self-sustaining to retain its deformed shape; that requires a minimum of supporting members; that provides visibility through it from the camouflaged location; that permits of ventilation for positions entirely covered by it; that can be produced in lengths or sizes that can be stored and transported in compact superimposed sheets and can be handled and manipulated manually when being installed into and removed from position, said sheets being capable of being joined together to shield an area of desired size; that will withstand climatic conditions and not deteriorate; that offers no resistance to wind, rain or snow to any excessive degree; that is so pre-fabricated as to give a varying density of tone color when viewed at ordinary ranges (a distance of approximately 600 feet) or greater, as will allow the material to blend and harmonize with the surrounding territory, background or landscape, and when properly colored or tinted, without discernment of the camouflaged objects or of the camouflage itself, as such; and so constructed that the light rays playing upon the camouflage material externally are diffused and absorbed within the body of the material itself and what light rays may be reflected from the camouflaged objects upon the camouflage material are absorbed by diffusion in the same manner on the interior or adjacent surface of the camouflage material so as to eliminate the possibility of silhouetting the camouflaged objects and, further, due to the construction of the camouflage material it casts little or a very feeble shadow of itself, thus there is no angle from which an objectionable reflection is cast; and that can be taken down, transported and re-located, as required, to camouflage factories, railroads, highways, buildings, gun emplacements, machine guns, individual soldiers, etc. The camouflage material, of the present invention, will be colored in any approved manner to harmonize with the coloring of any background or surrounding territory or landscape and is readily susceptible of being touched up or re-colored on the field or location where used.

Effective camouflaging with the material of the present invention may be accomplished without the use of leaves, branches, bushes or the like, being applied thereto, but the same may be employed if desired. While the present invention is useful for most all camouflaging, it appears that it is particularly adapted for "road-screens," "flat-tops," "sniper's blinds and hats."

To carry out the above and other objects, which will appear as the specification proceeds, the camouflage material of the present invention will be described more in detail, illustrated in the accompanying drawings by way of example, and pointed out in the appended claims.

In the drawings which show the preferred embodiments of the present invention as at present devised:

Fig. 1 is a fragmentary view of a sheet of the camouflage material showing different stages of the material in the course of manufacture;

Fig. 2 is an enlarged fragmentary section of the camouflage material having fluffed fibrous material, such as cotton, wiped over it to break the continuity of straight lines, the fluffed fibrous material being tinted as required;

Fig. 3 is an enlarged sectional view taken substantially on line 3—3 of Fig. 1 showing generally the manner in which the flock adheres to the fabricated sheet and the position it generally assumes.

Fig. 4 is a further enlargement similar to Fig. 3 illustrating the manner in which the flock diverts the light rays so that they are diffused and absorbed within the camouflage material itself;

Fig. 5 is a fragmentary elevation of a modified form of the invention employing chicken wire;

Fig. 6 is a general illustration of one manner of use of a camouflage material as a road screen;

Fig. 7 illustrates another use of camouflage material where it is self-sustaining for enclosing tanks, trucks and the like.

Fig. 8 shows the camouflage material used as a blind or sniper's hats; and

Fig. 9 shows the camouflage material used as a canopy or "flat-top" for gun emplacements, machine gun nests, coverage for tanks, etc.

In producing the camouflage material C of the present invention, strips of metal are fashioned and constructed as will produce a foraminous metal sheet 10, the openings 11 throughout the sheet being of considerably greater area than the adjacent solid or metal portions 12 between the openings. These solid or metal portions 12 having their wider surfaces a lying in a plane normal to the plane of the sheet or in a plane somewhat inclined to the plane of the sheet. The entire sheet of camouflage material is then dipped into or sprayed with a coating liquid 13 (lustrous or non-lustrous, as may be required) such as adhesive, paint, lacquer, etc., which may be colored or tinted as desired for camouflaging purposes. Before this coating dries, flock or fibrous material 14 is applied, preferably by dusting or spraying, to all exposed surfaces of the sheet. The flock may be the product of rayon, nylon, cotton, asbestos, sawdust, excelsior, spagnum moss, Spanish moss, etc., or other such short fibrous material, but it is preferred to use rayon flock because it projects (whisker-like) substantially perpendicular from the surface to which it is attached and does not have the tendency to curl or lie flat after a short time as does cotton or wool, in particular, or disintegrate after a short time or with use as does the moss. Then applying the flock to the coated metal screen it may be all of one color or patches of different colors, such as light green, yellow, dark brown, reddish brown and dark green, or may be applied to produce a variegated streak or mottle effect as may be necessary or required to harmonize with neighboring landscape where it is to be used—all of which is well known to the camoufluer. Of course, the completed sheet camouflage material, when located in a particular area, can be touched up by various shades of non-lustrous paint and/or the addition of more flock to vary its appearance as may be required.

It has been found that these small bristles or whisker-like projections of the flock serve two purposes, (1) it diffuses light directed upon or reflected by the camouflage material, thus giving a softer, more natural effect than when non-lustrous paint is used only, and (2) these bristles of flock projecting from the angular surfaces a of the members 12 tend to close or reduce, optically, the opening 11. When the flock is applied to these wide surfaces a, and since these surfaces are angular with respect to the surface of the plane of the sheet 10, the optical effect is, that of a continuous surface of varying density of tone color value when viewed from one angle at ordinary distances (as stated above) and when viewed from another angle, gives a still further varying density of tone value, thus simulating surface irregularities of natural or artificial objects and, also, aiding, in conjunction with the flock, in the diffusion and absorption of light. It has been found that this diffusion or absorption of light also acts to prevent shadows of the camouflaged objects from penetrating through the screen 10 in a manner that is discernible at ordinary distances of about 600 feet or more from the camouflage even in strong sun light.

It is of course understood that the flock material may be dispensed with where it is not found necessary for camouflaging at ordinary distances; for instance, to camouflage against planes flying at extremely high altitudes, the flock may not be needed on the camouflage, but a known non-lustrous paint or other coating may be sufficient.

For relatively close camouflaging—that is, at relatively close distances from the enemy—it has been found, by applying to the exterior surface of the camouflage sheet a light fluff of raw cotton 15, any straight line effects, that may be visible and produced by the portions 12 of the sheet 10, will be broken. The raw cotton or similar material may be applied by merely rubbing or smearing a quantity of it over the surface of the camouflage sheet and sufficient of it will become entangled or immeshed with the many fibres of flock as indicated in Figure 2. The raw cotton, or such like material, will be tinted as required or desired to blend with the camouflage requirement and the quantity which adheres to the sheet material is very thinly and sparsely divided and may be likened to the density simulating the appearance of cigarette smoke to obstruct observation of straight lines.

As one source of quick and ready supply for the foraminous sheet metal screen of the present invention, it has been found that expanded metal, or so-called "metal lath" of present manufacture is quite suitable and facilities already exist for its production in large quantities. In manufacture, several patterns of camouflage design may be applied at the plant and these designs selected for the areas of use to which they are particularly suited.

While for various purposes expanded or perforated metal having different size mesh may be employed, it is believed that for more general uses the standard metal lath having 1/4 to 3/8 inch openings will be found most desirable. With such last mentioned expanded metal the length of the projecting whiskers of flock will be from 1/32 to 1/16 of an inch in length although this is merely a recommendation and not a limitation because preference may dictate a longer or shorter length. In such cases where expanded metal lath may not be available, chicken wire 10a may be employed provided the mesh of such wire is not too large. It is recommended that the mesh of the chicken wire should not be greater than 3/4 of an inch and preferably smaller. The chicken wire will be treated in exactly the same manner as mentioned above, but the fibres would necessarily need to be longer to fill the voids or holes to give coverage. It is recommended that the length of the flock fibres be not less than 1/16 of an inch and preferably a little longer because of the omission of the wide surfaces a as shown in Figure 1.

In the application of the flock on the coated camouflage screen, especially of rayon and nylon or flock of other synthetic materials, it has been found that after they have been applied, and while the adhesive coating is still wet, if the sheet 10 is vibrated such as by tapping or shaking, a substantial portion of the flock will float on end giving the bristle effect. The phenomenon of this I am not in a position to explain.

The camouflage material of the present invention may be used for snipers' hats or blinds, as shown in Figure 8, which frequently represent bushes, tree stumps or rock. This may be accomplished by employing one or two lengths of camouflage material and bending them over and around the sniper in a manner that is well known.

The camouflage material may also be used for road screens, one manner of such use being supporting a number of sheets vertically edgewise in spaced relation over and adjacent a road, as generally indicated in Figure 6. These screens being supported by poles or attached to adjacent shrubbery or trees. They may also be used as "flat-tops" over gun emplacements, machine gun nests, over hangars, etc., as indicated in Figure 9, the screens being deformed according to the immediate requirement and the edge portion of the screen being curved or bent to an irregular form to break off the straight lines. Any props 16 that may be required are positioned, due to the rigidity of the camouflage material, well within the edge of the "flat-top" or canopy, as indicated, so that they cannot be observed. Also the camouflage material of the present invention may be used to entirely surround and cover tanks and trucks, as shown in Figure 7, with no additional supporting frames or props required.

As a modified form of the invention, the metal base 10, after the mesh has been formed therein and prior to the application of the adhesive coat thereto, may have a filler of a plastic material, such as rubber, cellulose acetate, Bakelite or the like, to fill in the voids and then entirely covered with the adhesive coating and flock as previously described. This will produce an impervious sheet and, according to the character of the plastic used, will be either transparent or translucent.

From the above it will be clear that a durable camouflage material has been produced having great tensile strength but can be bent manually to the desired shape and then straightened or flattened out again to be used many times over for that purpose; due to its strength and shape retaining ability, requires less props or other supports thus reducing material to be handled and transported; can be easily transported and transferred from place to place and is light in weight; is easily retoned on the field of use to meet the color conditions present; is fire proof; offers practically no resistance to wind; does not readily deteriorate because of rain or climatic conditions and is easily anchored; and gives ventilation and visibility to the military unit or units being camouflaged yet effectively camouflages so as not to reveal the existence of the camouflage, casting very little shadow and whatever shadow is cast is very feeble and not noticeable at ordinary distances.

When flock is referred to in the specification and claims I mean any fibrous, flaky or granular substances which have all the characteristics of common flock and these may be either vegetable, mineral, animal or synthetic, as may be available and useful at the time of manufacture.

Having thus described the invention and the manner in which the same is to be performed, that which is claimed as new is:

1. As a new article of manufacture, a camouflage material comprising a sheet of foraminous material adapted to be deformed into and out of different shapes and self-sustaining to retain said shapes, flock on all exposed surfaces of the sheet material and attached thereto by an adhesive coating and having portions thereof projecting beyond the coating to an extent less than the area of the openings in the sheet so that the openings in the sheet will not be entirely closed by the flock, all for the purposes described.

2. As a new article of manufacture, a camouflage material comprising a foraminous sheet of substantially rigid metal manually deformable to various shapes and self-sustaining in said deformed shapes, the openings in said sheet each being of greater area than the adjacent connecting webs of the sheet between said openings, flock on all exposed surfaces of the sheet material and attached thereto by an adhesive coating and having portions thereof projecting beyond the coating, said coating and flock being colored for camouflage purposes, all for the purposes described the openings in said foraminous material being sufficiently large with respect to the thickness of the applied flock so that the openings are not closed by said flock.

3. As a new article of manufacture, a camouflage material comprising a formanious sheet of substantially rigid metal manually deformable to various shapes and self-sustaining in said deformed shapes, the openings in said sheet each being of greater area than the adjacent connecting webs of the sheet between said openings, the said connecting webs having their surfaces within the openings extending at an angle to the plane of the sheet and being wider in cross section than their surfaces on the sides of the sheet, flock on all exposed surfaces of the sheet material and attached thereto by an adhesive coating and having portions thereof projecting beyond the coating, said coating and flock being colored for camouflage purposes, all for the purposes described the openings in said foraminous material being sufficiently large with respect to the thickness of the applied flock so that the openings are not closed by said flock.

4. As a new article of manufacture, a camouflage material comprising a foraminous sheet of substantially rigid metal manually deformable to various shapes and self-sustaining in said deformed shapes, the openings in said sheet each being of greater area than the adjacent connecting webs of the sheet between said openings, the said connecting webs having their surfaces within the openings extending obliquely to the plane of the sheet, flock on all exposed surfaces of the sheet material and attached thereto by an adhesive coating and having portions thereof projecting beyond the coating, said coating and flock being colored for camouflage purposes, all for the purposes described the openings in said foraminous material being sufficiently large with respect to the thickness of the applied flock so that the openings are not closed by said flock.

5. As a new article of manufacture, a camouflage material comprising a foraminous sheet of substantially rigid metal manually deformable to various shapes and self-sustaining in said deformed shapes, the openings in said sheet each being of greater area than the adjacent connecting webs of the sheet between said openings; the said connecting webs having their surfaces within the openings extending obliquely to the plane of the sheet; and being wider than their surfaces on the sides of the sheet, flock on all exposed surfaces of the sheet material and attached thereto by an adhesive coating and having portions thereof projecting beyond the coating, said coating and flock being colored for camouflage purposes, all for the purposes described the openings in said foraminous material being sufficiently large with respect to the thickness of the applied flock so that the openings are not closed by said flock.

6. As a new article of manufacture, a camouflage material comprising a sheet of foraminous material adapted to be deformed into and out of different shapes and self-sustaining to retain said shapes, flock on all exposed surfaces of the sheet material and attached thereto by an adhesive coating and having portions thereof projecting beyond the coating; and a fluffy fibrous material of longer fibres than said flock, sparsely and thinly applied to the sheet by entanglement with the flock thereon, said coating of flock and fluff material being colored according to any desired camouflage design or plan.

CARL E. WILLIAMS.